US007418613B2

(12) United States Patent
Hirai (10) Patent No.: US 7,418,613 B2
(45) Date of Patent: Aug. 26, 2008

(54) POWER SUPPLY CONTROL METHOD, POWER SUPPLY CONTROL UNIT AND INFORMATION PROCESSING APPARATUS (75) Inventor: Girou Hirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 11/023,644

(22) Filed: Dec. 29, 2004

(65) Prior Publication Data

US 2006/0047981 A1   Mar. 2, 2006

(30) Foreign Application Priority Data

Aug. 31, 2004   (JP) ............... 2004-253110

(51) Int. Cl.
*G06F 1/00* (2006.01)
*G06F 11/00* (2006.01)
(52) U.S. Cl. .................. 713/340; 713/300; 714/22; 714/47; 714/100
(58) Field of Classification Search ............ 714/47, 714/100, 22; 713/300, 340
See application file for complete search history.

(56) References Cited

U.S. PATENT DOCUMENTS 5,809,311 A * 9/1998 Jones ............... 713/300
6,236,226 B1 * 5/2001 Hagiwara ............... 324/771
6,601,181 B1 * 7/2003 Thomas ............... 713/340
2003/0033550 A1 * 2/2003 Kuiawa et al. ............ 713/340
2003/0074592 A1 * 4/2003 Hasegawa ............... 713/324
2005/0034003 A1 * 2/2005 Sato et al. ............... 713/340
2005/0052805 A1 * 3/2005 Sato et al. ............... 361/90

FOREIGN PATENT DOCUMENTS

JP   02-202611   8/1990
JP   06-314132   11/1994

* cited by examiner

*Primary Examiner*—Mark Connolly
*Assistant Examiner*—Jaweed A Abbaszadeh
(74) *Attorney, Agent, or Firm*—Staas & Halsey LLP (57) ABSTRACT

A power supply control method controls a supply of a power supply voltage from an uninterruptible power supply (UPS) to an information processing apparatus based on time information that is set in advance and indicates a date and time of turning ON and cutting OFF the supply of the power supply voltage. The power supply control method monitors, by a power supply control unit within the information processing apparatus, ON and/or OFF supply states of the power supply voltage with respect to the information processing apparatus at a time specified by the time information; and manages the ON and/or OFF supply states that are monitored, in a referable manner.

12 Claims, 5 Drawing Sheets

POWER SUPPLY CONTROL METHOD, POWER SUPPLY CONTROL UNIT AND INFORMATION PROCESSING APPARATUS

BACKGROUND OF THE INVENTION

This application claims the benefit of a Japanese Patent Application No. 2004-253110 filed Aug. 31, 2004, in the Japanese Patent Office, the disclosure of which is hereby incorporated by reference.

1. Field of the Invention

The present invention generally relates to power supply control methods, power supply control units and information processing apparatuses, and more particularly to a power supply control method using an uninterruptible power supply (UPS), a power supply control unit and an information processing apparatus that are used with an UPS.

2. Description of the Related Art

Depending on the usage of an information processing apparatus such as a general-purpose computer, the information processing apparatus is in a state connected to an uninterruptible power supply (UPS), so that the information processing apparatus can continue to operate even when a supply from an A.C. power supply stops due to a power failure or the like. The UPS is connected to the A.C. power supply. During normal operation, the information processing apparatus operates based on a power supply voltage that is supplied from the A.C. power supply via the UPS. When the supply of the power supply voltage from the A.C. power supply stops due to a power failure or the like, the UPS detects this abnormality and automatically supplies a power supply voltage from a battery or the like to the information processing apparatus, in place of the A.C. power supply. As a result, the information processing apparatus can continue to operate even when the abnormality such as the power failure occurs.

Some information processing apparatuses are provided with a schedule setting application that manages a schedule with which the supply of the power supply voltage is to be turned ON and cut OFF. When ON/OFF time information related to dates and times for turning ON and cutting OFF the supply of the power supply voltage is set to the schedule setting application, the ON/OFF time information is supplied to the UPS, and the UPS controls the ON/OFF of the supply of the power supply voltage to the information processing apparatus based on the ON/OFF time information.

However, the supply of the power supply voltage may not made based on the ON/OFF time information if a failure of the information processing apparatus and/or a failure of the UPS occur. For example, even though the schedule for turning ON the supply of the power supply voltage to the information processing apparatus at a certain date and time has been set to the schedule setting application, the supply of the power supply voltage to the information processing apparatus may not occur at the certain date and time. In such a case, an operator of the information processing apparatus must investigate the cause, that is, why the supply of the power supply voltage did not occur at the certain date and time, and attend to the repair of the failure. But when investigating the cause, the operator must first determine whether the failure occurred in the information processing apparatus or in the UPS, before detecting the actual location of the failure within the information processing apparatus or UPS, and then attend to the actual repair of the failure. Consequently, an extremely troublesome and time-consuming operation was required to restore the information processing apparatus and also the UPS if applicable. In addition, the reliability of the information processing apparatus deteriorated due to the time-consuming restoration operation.

SUMMARY OF THE INVENTION

Accordingly, it is a general object of the present invention to provide a novel and useful power supply control method, power supply control unit and information processing apparatus, in which the problems described above are suppressed.

Another and more specific object of the present invention is to provide a power supply control method, a power supply control unit and an information processing apparatus, which manage information related to abnormalities generated when turning ON and cutting OFF a supply of a power supply voltage via an uninterruptible power supply (UPS), so that a reference to the information can be made.

Still another specific object of the present invention is to provide a power supply control method, a power supply control unit and an information processing apparatus, which carry out a power ON recovery process if an abnormality is generated when supplying a power supply voltage via an UPS.

A further object of the present invention is to provide a power supply control method for controlling a supply of a power supply voltage from an uninterruptible power supply (UPS) to an information processing apparatus based on time information that is set in advance and indicates a date and time of turning ON and cutting OFF the supply of the power supply voltage, comprising monitoring, by a power supply control unit within the information processing apparatus, ON and/or OFF supply states of the power supply voltage with respect to the information processing apparatus at a time specified by the time information; and managing the ON and/or OFF supply states that are monitored, in a referable manner. According to the power supply control method of the present invention, it is possible to make an early detection of the abnormality in the turning ON and the cutting OFF of the supply of the power supply voltage, and thus, it is possible to quickly cope with the generated abnormality by carrying out a recovery process and the like. In addition, by carrying out a power ON recovery process within the information processing apparatus automatically to retry the supply of the power supply voltage with respect to the information processing apparatus when an abnormality is detected in the turning ON of the supply of the power supply voltage at the time specified by the time information although the power supply voltage is being supplied from the UPS, it may be possible to return the supply of the power supply voltage back to its normal state. Hence, it is possible to improve the reliability of the information processing apparatus, and also prevent unnecessary recovery process and the like.

Another object of the present invention is to provide a power supply control unit that is provided within an information processing apparatus and controls a supply of a power supply voltage from an uninterruptible power supply (UPS) to the information processing apparatus based on time information that is set in advance and indicates a date and time of turning ON and cutting OFF the supply of the power supply voltage, comprising a monitoring part configured to monitor ON and/or OFF supply states of the power supply voltage with respect to the information processing apparatus at a time specified by the time information; and a managing part configured to manage, in a referable manner, the ON and/or OFF supply states that are monitored by the monitoring part. According to the power supply control unit of the present invention, it is possible to make an early detection of the abnormality in the turning ON and the cutting OFF of the supply of the power supply voltage, and thus, it is possible to quickly cope with the generated abnormality by carrying out a recovery process and the like. In addition, by carrying out a power ON recovery process within the information processing apparatus automatically to retry the supply of the power supply voltage with respect to the information processing apparatus when an abnormality is detected in the turning ON of the supply of the power supply voltage at the time specified by the time information although the power supply voltage is being supplied from the UPS, it may be possible to return the supply of the power supply voltage back to its normal state. Hence, it is possible to improve the reliability of the information processing apparatus, and also prevent unnecessary recovery process and the like.

Still another object of the present invention is to provide an information processing apparatus comprising a schedule setting part configured to set in advance time information indicating a date and time of turning ON and cutting OFF a supply of a power supply voltage from an uninterruptible power supply (UPS) to the information processing apparatus; and a managing part configured to monitor ON and/or OFF supply states of the power supply voltage with respect to the information processing apparatus at a time specified by the time information, and managing the ON and/or OFF supply states in a referable manner. According to the information processing apparatus of the present invention, it is possible to make an early detection of the abnormality in the turning ON and the cutting OFF of the supply of the power supply voltage, and thus, it is possible to quickly cope with the generated abnormality by carrying out a recovery process and the like. In addition, by carrying out a power ON recovery process within the information processing apparatus automatically to retry the supply of the power supply voltage with respect to the information processing apparatus when an abnormality is detected in the turning ON of the supply of the power supply voltage at the time specified by the time information although the power supply voltage is being supplied from the UPS, it may be possible to return the supply of the power supply voltage back to its normal state. Hence, it is possible to improve the reliability of the information processing apparatus, and also prevent unnecessary recovery process and the like.

Other objects and further features of the present invention will be apparent from the following detailed description when read in conjunction with the accompanying drawings.

DESCRIPTION OF THE PREFERRED EMBODIMENTS

A description will be given of embodiments of a power supply control method, a power supply control unit and an information processing apparatus according to the present invention, by referring to the drawings.

Figure 1:
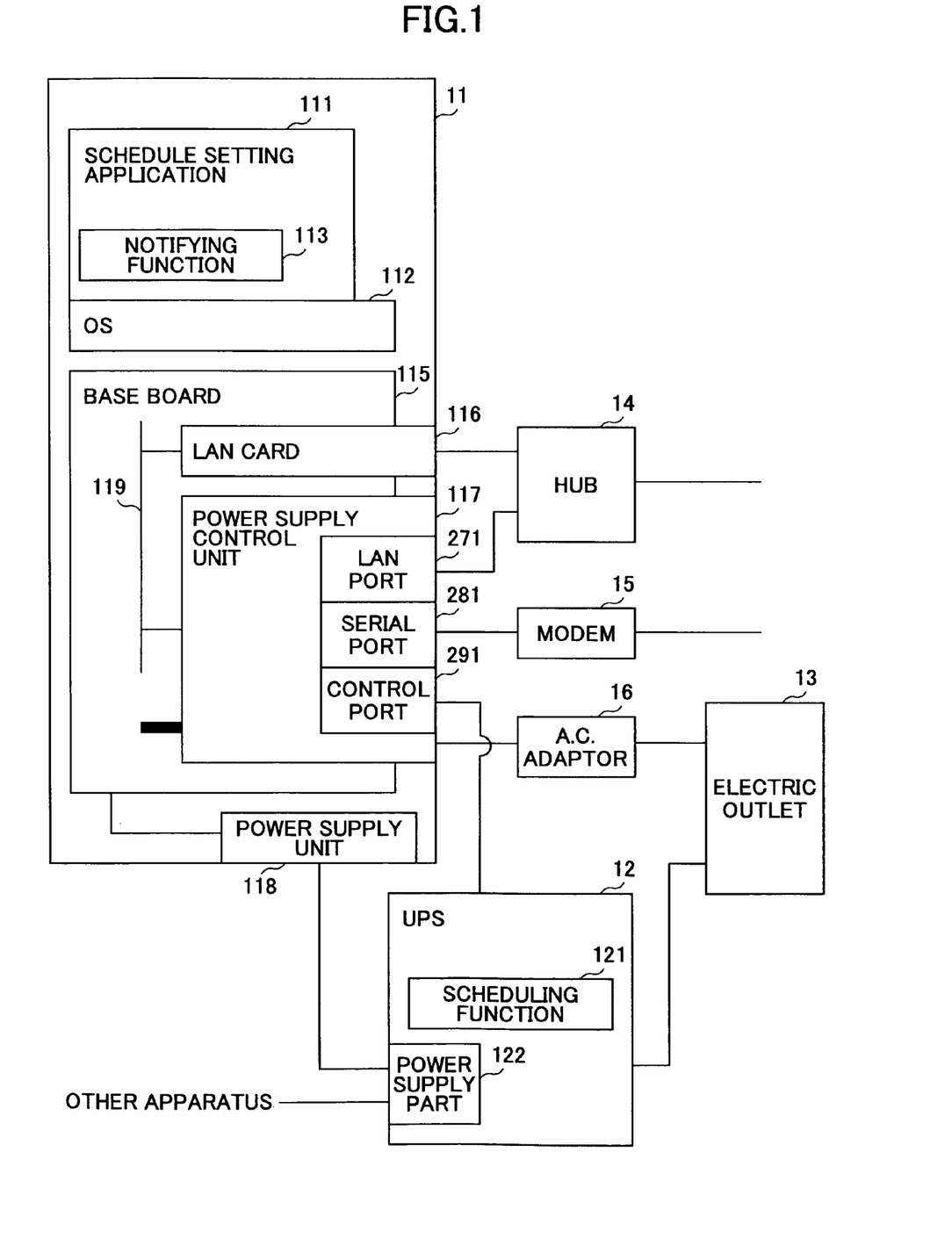
FIG. 1 is a system block diagram showing a first embodiment of an information processing apparatus according to the present invention together with an uninterruptible power supply (UPS)

FIG. 1 is a system block diagram showing a first embodiment of the information processing apparatus according to the present invention together with an uninterruptible power supply (UPS). This first embodiment of the information processing apparatus employs a first embodiment of the power supply control method according to the present invention and is provided with a first embodiment of the power supply control unit according to the present invention.

In FIG. 1, an information processing apparatus 11 is formed by a general-purpose computer or the like. The information processing apparatus 11 includes software such as a schedule setting application 111 and an operating system (OS) 112. The information processing apparatus 11 also includes hardware such as a base board 115 and a power supply unit 118. The schedule setting application 111 includes a notifying function 113. The base board 115 includes a local area network (LAN) card 116 and a power supply control unit 117 that are connected via a bus 119. The information processing apparatus 11 further includes an input device such as a keyboard, a display device and the like, similarly as in the case of the general-purpose computer, but illustration of such input and output devices is omitted in FIG. 1 for the sake of convenience.

An uninterruptible power supply (UPS) 12 is connected to an electric outlet 13 that is supplied with an A.C. power supply voltage from an A.C. power supply (not shown). The UPS 12 includes software such as a scheduling function 121, and hardware such as a power supply part 122 for supplying a power supply voltage to the information processing apparatus 11. The UPS 12 has a known basic structure for supplying the A.C. power supply voltage from the electric outlet 13 via the power supply part 122 to the information processing apparatus 11 in a normal state, and for supplying a power supply voltage from another power supply, such as an internal or external battery (not shown) of the UPS 12 via the power supply part 122 to the information processing apparatus 11 in an abnormal state such as when a power failure occurs. In a case where the UPS 12 supplies the power supply voltage to a plurality of apparatuses, the power supply part 122 is also connected to the plurality of apparatuses other than the information processing apparatus 11.

In this embodiment, the LAN card 116 and a LAN port 271 of the information processing apparatus 11 are connected to a network (not shown) via a hub 14. In addition, a serial port 281 of the information processing apparatus 11 is connected to the network via a modem 15. The modem 15 may be provided within the information processing apparatus 11. An A.C. adaptor 16 may be omitted. When the A.C. adaptor 16 is provided, it is possible to supply the A.C. power supply voltage from the electrical outlet 13 to the power supply control unit 117 via the A.C. adaptor 16, and it is possible to operate the power supply control unit 117 by a power supply different from the power supply which operates the information processing apparatus 11 by appropriately selecting the electrical outlet 13 to which the A.C. adaptor 16 is connected.

The schedule setting application 111 of the information processing apparatus 11 manages a schedule with which the supply of the power supply voltage with respect to the information processing apparatus 11 is turned ON and cut OFF. When an operator of the information processing apparatus 11 sets ON/OFF time information (or schedule information) related to dates and times for turning ON and cutting OFF the supply of the power supply voltage from the input device of the information processing apparatus 11 to the schedule setting application 111, the ON/OFF time information is supplied to the UPS 12, and the UPS 12 controls the turning ON and cutting OFF of the supply of the power supply voltage to the information processing apparatus 11 by the scheduling function 121 based on the ON/OFF time information. The OS 112 of the information processing apparatus 11 controls the operation of the entire information processing apparatus 11. Known software may be used for each of the schedule setting application 111 and the OS 112.

The LAN card 116, that is mounted on the base board 115, carries out a communication control when the information processing apparatus 11 makes a communication with another information processing apparatus via the network such as a LAN. The power supply control unit 117, that is mounted on the base board 115, is formed by monitoring hardware which carries out various power supply control that includes monitoring and notifying the supply state of the power supply, by providing an internal interface within the base board 115 and an interface with respect to management software. In this embodiment, the power supply control unit 117 takes the form of a control card such as a PCI card. In the case where the power supply control unit 117 takes the form of the PCI card, the bus 119 is formed by a PCI bus.

The power supply unit 118 of the information processing apparatus 11 generates various voltages to be used within the information processing apparatus 11, based on the power supply voltage that is supplied from the UPS 12, and supplies the various voltages to various parts within the information processing apparatus 11. A known power supply unit may be used for the power supply unit 118.

Figure 2:
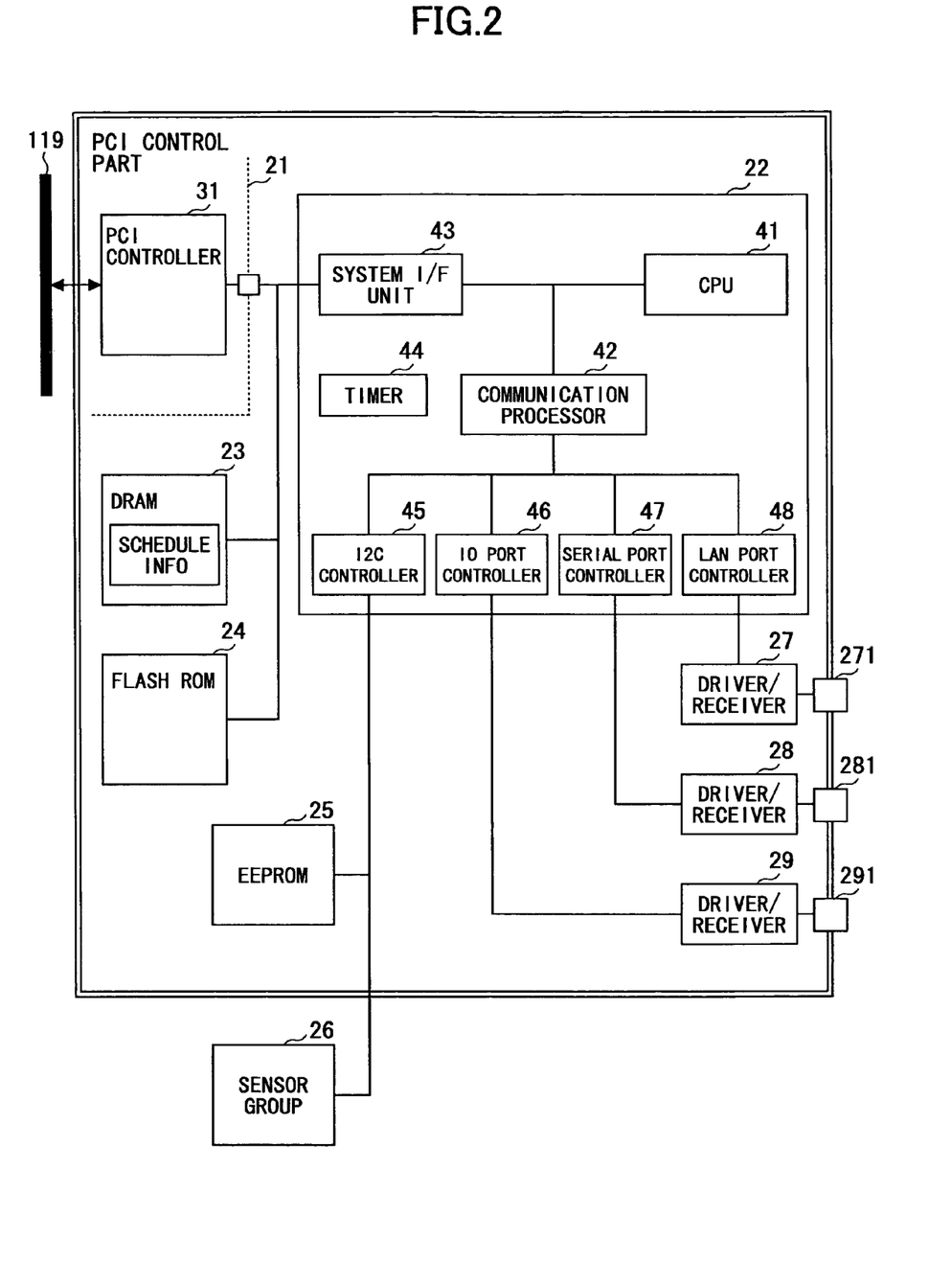
FIG. 2 is a system block diagram showing a structure of a power supply control unit within the information processing apparatus.

FIG. 2 is a system block diagram showing a structure of the power supply control unit 117 within the information processing apparatus 11. As shown in FIG. 2, the power supply control unit 117 includes a PCI control part 21, a managing part 22, a DRAM 23, a flash ROM 24, an EEPROM 25, a driver and receiver (driver/receiver) 27 that is connected to the LAN port 271, a driver and receiver (driver/receiver) 28 that is connected to the serial port 281, and a driver and receiver (driver/receiver) 29 that is connected to a control port 291.

The PCI control part 21 includes a PCI controller 31 which carries out a memory control and the like within the power supply control unit 117. The DRAM 23 stores the schedule information that is set by the schedule setting application 111. The flash ROM 24 stores data and programs to be executed by a CPU 41 of the managing part 22. The EEPROM 25 stores information related to the PCI card, such as an identification (ID) number of the PCI card.

A sensor group 26 includes a plurality of sensors which detect states of various hardware within the information processing apparatus 11. In this embodiment, the sensor group 26 includes a temperature sensor that detects a temperature within the information processing apparatus 11, a voltage sensor that detects a voltage at a predetermined part (or location) within the information processing apparatus 11, a sensor that detects a state of a fan (not shown) within the information processing apparatus 11, and a sensor that detects a state of the power supply unit 118. A portion of the sensors forming the sensor group 26 may of course be provided within the power supply control unit 117.

The managing part 22 includes the CPU 41, a communication processor 42, a system interface (I/F) unit 43, a timer 44, an I2C controller 45, an input and output (IO) port controller 46, a serial port controller 47, and a LAN port (Ethernet) controller 48.

The CPU 41 controls the operation of the entire power supply control unit 117. More particularly, the CPU 41 carries out various power supply control that includes monitoring and notifying the supply state of the power supply and the like. The power supply control includes controlling the turning ON and the cutting OFF (ON/OFF) the supply of the power supply voltage, resetting the supply of the power supply voltage, a non-maskerable interrupt (NMI) and the like. The monitoring of the supply state of the power supply includes hardware monitoring and software monitoring. The hardware monitoring includes monitoring the temperature within the information processing apparatus 11, the voltage at a predetermined part within the information processing apparatus 11, the state of the fan, the state of the power supply unit 118 and the like, based on detection signals received from the sensor group 26. On the other hand, the software monitoring includes monitoring hang states of a post hang, a boot hang, an operation system (OS) hang and the like.

The CPU 41 also controls a power ON recovery process and a display. The recovery process control includes resetting the supply of the power supply voltage upon detection of an abnormality, turning ON and cutting OFF the supply of the power supply voltage, and the like. The display control includes controlling display screens, display messages and the like on the display device. Furthermore, the CPU 41 monitors the turning ON and cutting OFF (ON/OFF) of the supply of the power supply voltage at the date and time specified by the schedule information, and manages the monitored ON/OFF supply state of the power supply voltage so that a reference to the monitored ON/OFF supply state can be made. In other words, information related to the monitored ON/OFF supply state of the power supply voltage is managed, in a referable manner, in a memory region of the DRAM 23 or the like, for example. A reference to the information (particularly the information related to abnormality) managed in this memory region may be made in response to a request from the operator, and the referred information may be displayed on the display device in a form of a log, for example.

The communication processor 42 controls communications within the information processing apparatus 11, including communications between the base board 115 and the software such as the schedule setting application 111 and the OS 112, and communications between the information processing apparatus 11 and an external apparatus or unit such as the UPS 12. The system I/F unit 43 connects the power supply control unit 117 to other parts within the information processing apparatus 11 via the PCI controller 21. The timer 44 manages time information such as a present time.

The I2C controller 45 controls the connection of the 2 ports of the managing part 22 with respect to the EEPROM 25 and the sensor group 26, under a control of the communication processor 42. IO port controller 46 controls the connection of the managing part 22 and the control port 291 via the driver/receiver 29, under a control of the communication processor 42. The serial port controller 47 controls the connection of the managing part 22 and the serial port 281 via the driver/receiver 28, under a control of the communication processor 42. The LAN port controller 48 controls the connection of the managing part 22 and the LAN port 271 via the driver/receiver 27, under a control of the communication processor 42. The control port 291 is connected to the UPS 12, and is used in this embodiment to notify the schedule information from the information processing apparatus 11 to the UPS 12 and to notify the start of the supply of the power supply voltage from the UPS 12 to the information processing apparatus 11. Arbitrary protocols may be used for the various notifications made via the control port 291. For example, SNMP, SNMP (e-mail), Pager and the like may be used as the protocol for the various notifications made via the control port 291.

Figure 3:
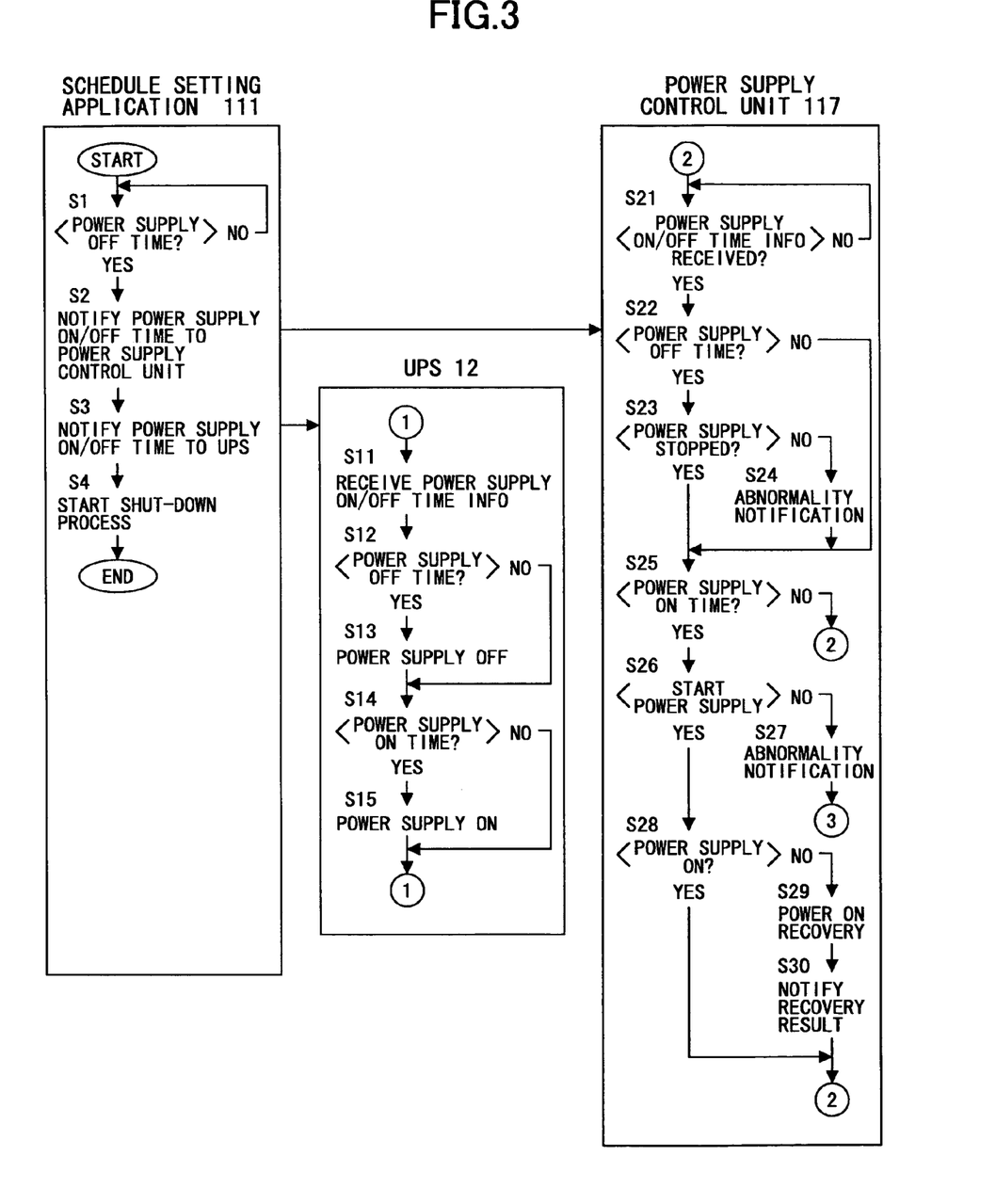
FIG. 3 is a flow chart for explaining an operation of the first embodiment.

FIG. 3 is a flow chart for explaining an operation of this first embodiment. FIG. 3 shows processes of the schedule setting application 111 and the power supply control unit 117 of the information processing apparatus 11, and a process of the UPS 12.

In FIG. 3, the schedule setting application 111 decides, in a step S1, whether or not a present time is the date and time for cutting OFF the supply of the power supply voltage, based on the schedule information which has been set in advance. The process advances to a step S2 if the decision result in the step S1 is YES. The step S2 notifies the schedule information to the power supply control unit 117, and a step S3 notifies the schedule information to the UPS 12 via the control port 291. Accordingly, the power supply control unit 117 and the UPS 12 can acquire, from the notified schedule information, the date and time for turning ON and the date and time for cutting OFF the supply of the power supply voltage. A step S4 starts a shut-down process that cuts OFF the supply of the power supply voltage, and the process ends.

The schedule function 121 of the UPS 12 is notified of the schedule information from the schedule setting application 111 in a step S11, and a step S12 decides whether or not the present time is the date and time for cutting OFF the supply of the power supply voltage, based on the schedule information. The schedule information notified from the schedule setting application 111 may be: (i) ON/OFF time information related to the next date and time for cutting OFF and the next date and time for turning ON the supply of the power supply voltage or, (ii) ON/OFF time information calculated from the present time (or notification time). In the latter case (ii), the UPS 12 can judge the date and time for cutting OFF and the date and time for turning ON the supply of the power supply voltage, based on the ON/OFF time information calculated from the present time (or notification time) and time information that is managed by an internal timer (not shown) of the schedule function 121. If the decision result in the step S12 is YES, a step S13 cuts OFF the supply of the power supply voltage, and the process advances to a step S14 which will be described later. On the other hand, if the decision result in the step S12 is NO, the process advances to the step S14.

The step S14 decides whether or not the present time is the date and time for turning ON the supply of the power supply voltage. The process returns to the step S11 if the decision result in the step S14 is NO. If the decision result in the step S14 is YES, a step S15 starts the supply of the power supply voltage, and sends to the control port 291 ON start information that indicates that the supply of the power supply voltage has started, so as to notify the ON start information to the power supply control unit 117. The process returns to the step S11 after the step S15.

The power supply control unit 117 is notified of the schedule information from the schedule setting application 111 in a step S21. A step S22 decides whether or not the present time is the date and time for cutting OFF the supply of the power supply voltage, based on the schedule information. The schedule information notified from the schedule setting application 111 may be: (i) ON/OFF time information related to the next date and time for cutting OFF and the next date and time for turning ON the supply of the power supply voltage or, (ii) ON/OFF time information calculated from the present time (or notification time). In the latter case (ii), the power supply control unit 117 can judge the date and time for cutting OFF and the date and time for turning ON the supply of the power supply voltage, based on the ON/OFF time information calculated from the present time (or notification time) and time information that is managed by the timer 44. If the decision result in the step S22 is YES, a step S23 decides whether or not the supply of the power supply voltage with respect to the information processing apparatus 11 is cut OFF, and the process advances to a step S25 which will be described later if the decision result in the step S23 is YES. On the other hand, if the decision result in the step S22 is NO, the process advances to the step S25.

On the other hand, if the decision result in the step S23 is NO, a step S24 makes an abnormality notification, indicating that an abnormality has occurred, with respect to the schedule setting application 111 and/or the OS 112, and the process advances to the step S25. The schedule setting application 111 and/or the OS 112, which receives the abnormality notification, notifies the abnormal state to the operator of the information processing apparatus 11 by displaying a message indicating the abnormality on the display device, for example.

The step S25 decides whether or not the present time is the date and time for turning ON the supply of the power supply voltage. The process returns to the step S21 if the decision result in the step S25 is NO. If the decision result in the step S25 is YES, a step S26 decides whether or not the supply of the power supply voltage from the UPS 12 with respect to the information processing apparatus 11 has been started, based on the ON start information from the from the UPS 12. If the decision result in the step S26 is YES, a step S28 decides whether or not the supply of the power supply voltage with respect to the information processing apparatus 11 has been started. The process returns to the step S21 if the decision result in the step S28 is YES.

If the decision result in the step S26 is NO, a step S27 makes an abnormality notification, indicating that an abnormality has occurred, with respect to the schedule setting application 111 and/or the OS 112, and the process returns to the step S21. The schedule setting application 111 and/or the OS 112, which receives the abnormality notification, notifies the abnormal state to the operator of the information processing apparatus 11 by displaying a message indicating the abnormality on the display device, for example.

In a case where the supply of the power supply voltage from the UPS 12 has been started but the supply of the power supply voltage to the information processing apparatus 11 has not been started for some reason, the decision result in the step S28 becomes NO, and the process advances to a step S29. The step S29 carries out a power ON recovery process to retry the supply of the power supply voltage to the information processing apparatus 11. A step S30 makes a recovery result notification, indicating the result of the power ON recovery process, with respect to the schedule setting application 111 and/or the OS 112, and the process returns to the step S21. The schedule setting application 111 and/or the OS 112, which receives the recovery result notification, notifies the recovery result to the operator of the information processing apparatus 11 by displaying a message indicating the abnormality on the display device, for example.

According to this embodiment, it is possible to make an early detection of the abnormality in the turning ON and the cutting OFF of the supply of the power supply voltage, and thus, it is possible to quickly cope with the generated abnormality by carrying out a recovery process and the like. In addition, by carrying out the power ON recovery process automatically to retry the supply of the power supply voltage with respect to the information processing apparatus when an abnormality is detected in the turning ON of the supply of the power supply voltage at the time specified by the time information although the power supply voltage is being supplied from the UPS, it may be possible to return the supply of the power supply voltage back to its normal state. Hence, it is possible to improve the reliability of the information processing apparatus, and also prevent unnecessary recovery process and the like.

Figure 4:
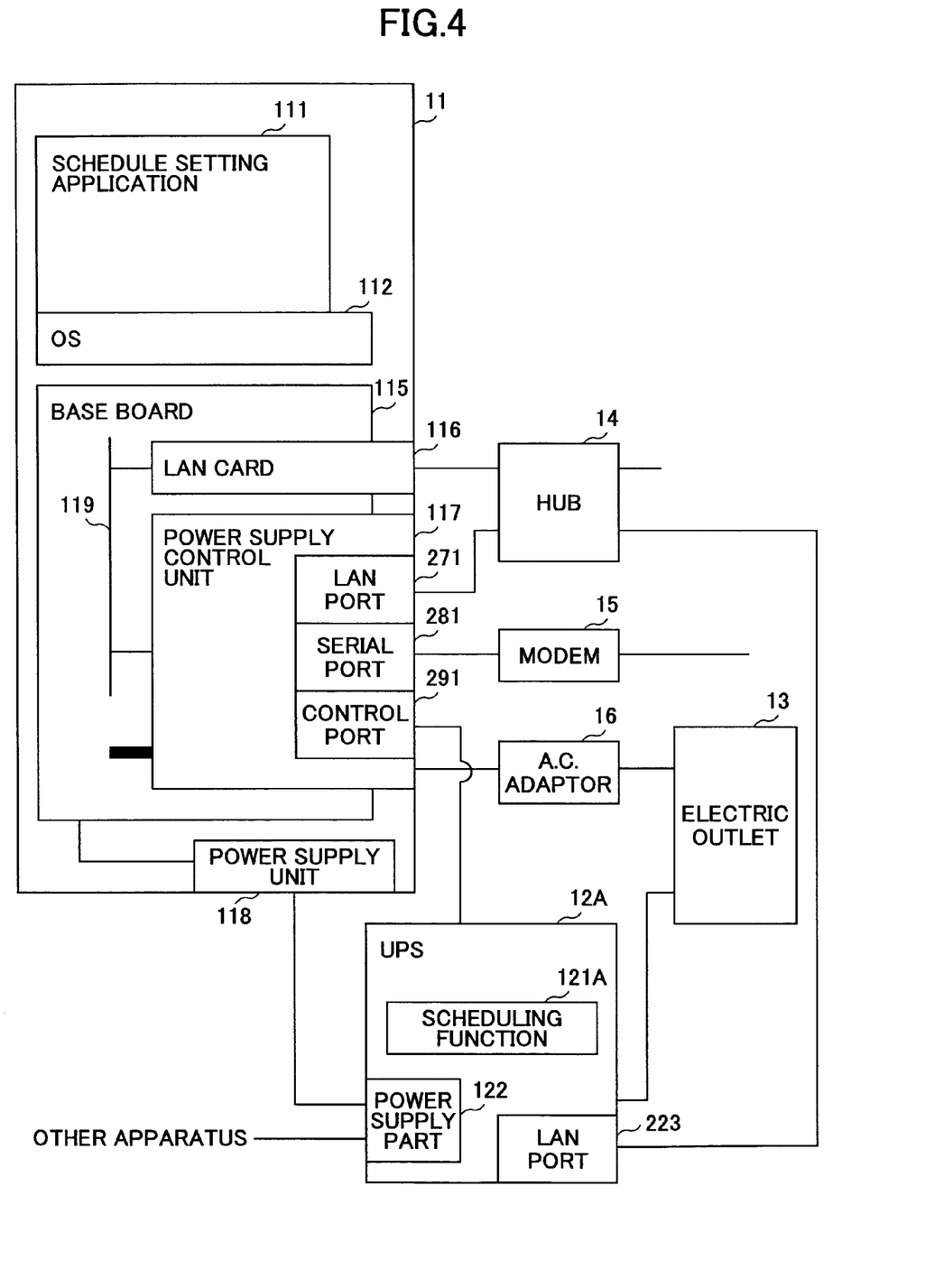
FIG. 4 is a system block diagram showing a second embodiment of the information processing apparatus according to the present invention together with an UPS.

FIG. 4 is a system block diagram showing a second embodiment of the information processing apparatus according to the present invention together with an UPS. In FIG. 4, those parts which are the same as those corresponding parts in FIG. 1 are designated by the same reference numerals, and a description thereof will be omitted.

In FIG. 4, an UPS 12A includes a schedule function 121A, a power supply part 122 and a LAN port 123. The LAN port 123 is connected to the LAN port 271 of the information processing apparatus 11 via the hub 14. When the UPS 12A cuts OFF the supply of the power supply voltage with respect to the information processing apparatus 11, the UPS 12A notifies OFF information related to this cutting OFF of the supply of the power supply voltage to the power supply control unit 117 of the information processing apparatus 11 via the LAN port 123, the hub 14 and the LAN port 271. The notification of the OFF information may be made using an arbitrary protocol. In this embodiment, the ON start information related to the start of the supply of the power supply voltage and the OFF information related to the cutting OFF of the supply of the power supply voltage are notified from the UPS 12A to the power supply control unit 117 of the information processing apparatus 11.

Figure 5:
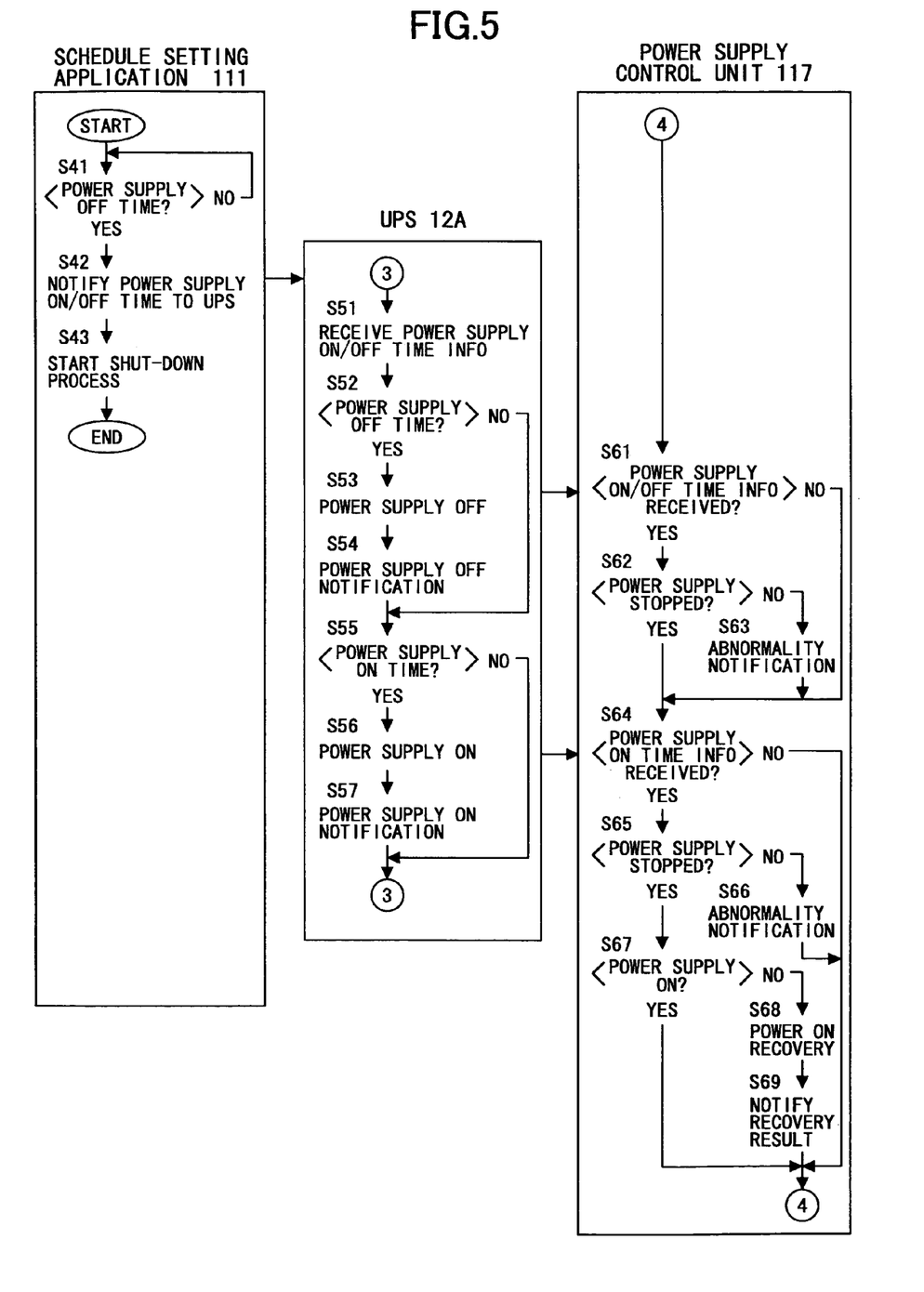
FIG. 5 is a flow chart for explaining an operation of the second embodiment.

FIG. 5 is a flow chart for explaining an operation of this second embodiment. FIG. 5 shows processes of the schedule setting application 111 and the power control unit 117 of the information processing apparatus 11 and a process of the UPS 12A.

In FIG. 5, the schedule setting application 111 decides, in a step S41, whether or not a present time is the date and time for cutting OFF the supply of the power supply voltage, based on the schedule information which has been set in advance. The process advances to a step S42 if the decision result in the step S41 is YES. The step S42 notifies the schedule information to the UPS 12A. Accordingly, the UPS 12A can acquire, from the notified schedule information, the date and time for turning ON and the date and time for cutting OFF the supply of the power supply voltage. A step S43 starts a shut-down process that cuts OFF the supply of the power supply voltage, and the process ends.

A schedule function 121A of the UPS 12A is notified of the schedule information from the schedule setting application 111 in a step S51, and a step S52 decides whether or not the present time is the date and time for cutting OFF the supply of the power supply voltage, based on the schedule information. The schedule information notified from the schedule setting application 111A may be: (i) ON/OFF time information related to the next date and time for cutting OFF and the next date and time for turning ON the supply of the power supply voltage or, (ii) ON/OFF time information calculated from the present time (or notification time). In the latter case (ii), the UPS 12A can judge the date and time for cutting OFF and the date and time for turning ON the supply of the power supply voltage, based on the ON/OFF time information calculated from the present time (or notification time) and time information that is managed by an internal timer (not shown) of the schedule function 121A. If the decision result in the step S52 is YES, a step S53 cuts OFF the supply of the power supply voltage, and the process advances to a step S54. The step S54 notifies OFF information related to the cutting OFF of the supply of the power supply voltage to the power supply control unit 117 of the information processing apparatus via the LAN port 123, the hub 14 and the LAN port 271, and the process advances to a step S55 which will be described later. On the other hand, if the decision result in the step S52 is NO, the process advances to the step S55.

The step S55 decides whether or not the present time is the date and time for turning ON the supply of the power supply voltage. The process returns to the step S51 if the decision result in the step S55 is NO. If the decision result in the step S55 is YES, a step S56 starts the supply of the power supply voltage, and sends to the control port 291 ON start information that indicates that the supply of the power supply voltage has started, so as to notify the ON start information to the power supply control unit 117. The process returns to the step S51 after the step S56.

The power supply control unit 117 decides, in a step S61, whether or not the OFF information is notified from the UPS 12A. The process advances to a step S64 which will be described later if the decision result in the step S61 is NO. On the other hand, if the decision result in the step S61 is YES, a step S62 decides whether or not the supply of the power supply voltage with respect to the information processing apparatus 11 is cut OFF, and the process advances to the step S64 if the decision result in the step S62 is YES.

On the other hand, if the decision result in the step S62 is NO, a step S63 makes an abnormality notification, indicating that an abnormality has occurred, with respect to the schedule setting application 111 and/or the OS 112, and the process advances to the step S64. The schedule setting application 111 and/or the OS 112, which receives the abnormality notification, notifies the abnormal state to the operator of the information processing apparatus 11 by displaying a message indicating the abnormality on the display device, for example.

The step S64 decides whether or not the present time is the date and time for turning ON the supply of the power supply voltage. The process returns to the step S61 if the decision result in the step S64 is NO. If the decision result in the step S64 is YES, a step S65 decides whether or not the supply of the power supply voltage from the UPS 12A with respect to the information processing apparatus 11 has been started, based on the ON start information from the from the UPS 12A. If the decision result in the step S65 is YES, a step S67 decides whether or not the supply of the power supply voltage with respect to the information processing apparatus 11 has been started. The process returns to the step S61 if the decision result in the step S67 is YES.

If the decision result in the step S65 is NO, a step S66 makes an abnormality notification, indicating that an abnormality has occurred, with respect to the schedule setting application 111 and/or the OS 112, and the process returns to the step S61. The schedule setting application 111 and/or the OS 112, which receives the abnormality notification, notifies the abnormal state to the operator of the information processing apparatus 11 by displaying a message indicating the abnormality on the display device, for example.

In a case where the supply of the power supply voltage from the UPS 12A has been started but the supply of the power supply voltage to the information processing apparatus 11 has not been started for some reason, the decision result in the step S67 becomes NO, and the process advances to a step S68. The step S68 carries out a power ON recovery process to retry the supply of the power supply voltage to the information processing apparatus 11. A step S69 makes a recovery result notification, indicating the result of the power ON recovery process, with respect to the schedule setting application 111 and/or the OS 112, and the process returns to the step S61. The schedule setting application 111 and/or the OS 112, which receives the recovery result notification, notifies the recovery result to the operator of the information processing apparatus 11 by displaying a message indicating the abnormality on the display device, for example.

According to this embodiment, it is possible to make an early detection of the abnormality in the turning ON and the cutting OFF of the supply of the power supply voltage, and thus, it is possible to quickly cope with the generated abnormality by carrying out a recovery process and the like. In addition, by carrying out the power ON recovery process automatically to retry the supply of the power supply voltage with respect to the information processing apparatus when an abnormality is detected in the turning ON of the supply of the power supply voltage at the time specified by the time information although the power supply voltage is being supplied from the UPS, it may be possible to return the supply of the power supply voltage back to its normal state. Hence, it is possible to improve the reliability of the information processing apparatus, and also prevent unnecessary recovery process and the like.

In the first embodiment, an UPS having a known basic structure may be used for the UPS 12. On the other hand, in the second embodiment, an UPS that may be used for the UPS 12A must have a basic structure that is added with a function of notifying the OFF information from the UPS 12A to the information processing apparatus. However, the second embodiment does not require the schedule information to be notified from the schedule setting application 111 to the power supply control unit 117, and a corresponding reduction can be made in the load on the schedule setting application 111.

In each of the embodiments described above, the ON start information from the UPS 12 or 12A is sent to the power supply control unit 117 via the control port 291, and the OFF information from the UPS 12A is sent to the power supply control unit 117 via the control port 291. However, the manner in which the ON start information and the OFF information is sent is of course not limited to such. For example, both the ON start information and the OFF information may be sent via the control port 291. Further, both the ON start information and the OFF information may be sent via the LAN port 271.

Further, the present invention is not limited to these embodiments, but various variations and modifications may be made without departing from the scope of the present invention.

What is claimed is:

1. A power supply control method for controlling a supply of a power supply voltage from an uninterruptible power supply (UPS) to an information processing apparatus based on time information that is set in advance and indicates a date and time of turning ON and cutting OFF the supply of the power supply voltage, comprising:
   monitoring, by a power supply control unit within the information processing apparatus, ON and/or OFF supply states of the power supply voltage with respect to the information processing apparatus at a time specified by the time information;
   managing the ON and/or OFF supply states that are monitored, in a referable manner; and
   making an abnormality notification from the power supply control unit to an arbitrary notifying destination when said monitoring detects an abnormality in the turning ON or cutting OFF of the supply of the power supply voltage at the time specified by the time information.

2. The power supply control method as claimed in claim 1, further comprising:
   notifying that the supply of the power supply voltage with respect to the information processing apparatus is turned ON or cut OFF, from the UPS to the information processing apparatus, when the supply of the power supply voltage is turned ON or cut OFF,
   said monitoring detecting an abnormality in the turning ON or cutting OFF of the supply of the power supply voltage at the time specified by the time information, based on a notification from the UPS made by said notifying.

3. The power supply control method as claimed in claim 1, further comprising:
   starting a power ON recovery process within the information processing apparatus from the power supply control unit if said monitoring detects an abnormality in the turning ON or cutting OFF of the supply of the power supply voltage at the time specified by the time information and the supply of the power supply voltage is received from the UPS.

4. The power supply control method as claimed in claim 3, further comprising:
   notifying a result of the power ON recovery process from the power supply control unit to an arbitrary notifying destination.

5. A power supply control unit that is provided within an information processing apparatus and controls a supply of a power supply voltage from an uninterruptible power supply (UPS) to the information processing apparatus based on time information that is set in advance and indicates a date and time of turning ON and cutting OFF the supply of the power supply voltage, comprising:
   a monitoring part configured to monitor ON and/or OFF supply states of the power supply voltage with respect to the information processing apparatus at a time specified by the time information;
   a managing part configured to manage, in a referable manner, the ON and/or OFF supply states that are monitored by the monitoring part; and
   a notifying part configured to make an abnormality notification to an arbitrary notifying destination when the monitoring Part detects an abnormality in the turning ON or cutting OFF of the supply of the power supply voltage at the time specified by the time information.

6. The power supply control unit as claimed in claim 5, wherein:
   the UPS comprises a notifying part configured to notify to the information processing apparatus that the supply of the power supply voltage with respect to the information processing apparatus is turned ON or cut OFF, when the supply of the power supply voltage is turned ON or cut OFF, and
   the monitoring part detects an abnormality in the turning ON or cutting OFF of the supply of the power supply voltage at the time specified by the time information, based on a notification received from the notifying part of the UPS.

7. The power supply control unit as claimed in claim 5, further comprising:
   a starting part configured to start a power ON recovery process within the information processing apparatus if the monitoring part detects an abnormality in the turning ON or cutting OFF of the supply of the power supply voltage at the time specified by the time information and the supply of the power supply voltage is received from the UPS.

8. The power supply control unit as claimed in claim 7, further comprising:
a notifying part configured to notify a result of the power ON recovery process to an arbitrary notifying destination.

9. An information processing apparatus, comprising:
a schedule setting part configured to set in advance time information indicating a date and time of turning ON and cutting OFF a supply of a power supply voltage from an uninterruptible power supply (UPS) to the information processing apparatus;
a managing part configured to monitor ON and/or OFF supply states of the power supply voltage with respect to the information processing apparatus at a time specified by the time information, and managing the ON and/or OFF supply states in a referable manner; and
a notifying part configured to make an abnormality notification to an arbitrary notifying destination when the managing part detects an abnormality in the turning ON or cutting OFF of the supply of the power supply voltage at the time specified by the time information.

10. The information processing apparatus as claimed in claim 9, wherein:
the UPS comprises a notifying part configured to notify to the information processing apparatus that the supply of the power supply voltage with respect to the information processing apparatus is turned ON or cut OFF, when the supply of the power supply voltage is turned ON or cut OFF, and
the managing part detects an abnormality in the turning ON or cutting OFF of the supply of the power supply voltage at the time specified by the time information, based on a notification received from the notifying part of the UPS.

11. The information processing apparatus as claimed in claim 9, further comprising:
a starting part configured to start a power ON recovery process within the information processing apparatus if the managing part detects an abnormality in the turning ON or cutting OFF of the supply of the power supply voltage at the time specified by the time information and the supply of the power supply voltage is received from the UPS.

12. The information processing apparatus as claimed in claim 11, further comprising:
a notifying part configured to notify a result of the power ON recovery process to an arbitrary notifying destination.

* * * * *

UNITED STATES PATENT AND TRADEMARK OFFICE
CERTIFICATE OF CORRECTION

| | |
|---|---|
| PATENT NO. | : 7,418,613 B2 |
| APPLICATION NO. | : 11/023644 |
| DATED | : August 26, 2008 |
| INVENTOR(S) | : Girou Hirai |

It is certified that error appears in the above-identified patent and that said Letters Patent is hereby corrected as shown below:

Column 12, Line 43, change "Part" to --part--.

Signed and Sealed this

Ninth Day of December, 2008

JON W. DUDAS
*Director of the United States Patent and Trademark Office*